United States Patent [19]
Ohmura

[11] 3,756,528
[45] Sept. 4, 1973

[54] ROLL FILM FOR DOUBLE MAGAZINE
[75] Inventor: Hiroshi Ohmura, Tokyo, Japan
[73] Assignee: Fuji Photo Film Co., LTD., Kanagawa, Japan
[22] Filed: Sept. 7, 1971
[21] Appl. No.: 178,147

[30] Foreign Application Priority Data
Sept. 8, 1970 Japan .............................. 45/78681

[52] U.S. Cl. ................................. 242/74, 242/71.2
[51] Int. Cl. ............................................. B65h 75/28
[58] Field of Search ............................. 242/74, 71.2

[56] References Cited
UNITED STATES PATENTS
3,084,884  4/1963  Panzer ................................. 242/74
2,900,868  8/1959  Gaffney .......................... 242/74 X
FOREIGN PATENTS OR APPLICATIONS
865,070  1/1953  Germany .............................. 242/74

Primary Examiner—George F. Mautz
Assistant Examiner—Edward J. McCarthy
Attorney—Richard C. Sughrue, Donald E. Zinn et al.

[57] ABSTRACT

A roll film assembly for a double magazine having spool holders of identical construction includes a folded paper connecting strip having a first adhesive covered portion adjacent the fold line for fixing the paper strip to one of the spools and a second adhesive covered portion at the edge of the folded paper for sandwiching an unexposed film therebetween. Aligned perforations within each layer of the folded paper strip intermediate of the first and second adhesive covered portions permit the exposed film to be separated from the supply spool and further permit the leading end of a new roll of unexposed film to be inserted between the reminent portions of the layers of the folded paper strip for facilitating the attachment of new film thereto with this section of the magazine then acting as the take-up spool for the film roll.

2 Claims, 5 Drawing Figures

PATENTED SEP 4 1973 3,756,528

ROLL FILM FOR DOUBLE MAGAZINE

BACKGROUND OF THE INVENTION

1. FIELD OF THE INVENTION

The present invention relates to a novel roll film adapted for a double magazine system in which a film wound in one film magazine is taken up in another film magazine of the identical construction with that of the former.

2. DESCRIPTION OF THE PRIOR ART

Heretofore, in loading a roll film with a backing paper to a camera a complicated and troublesome operation is required. Further, the flatness of the film at the exposure aperture is adversely affected by the existence of the backing paper. One of the conventional double magazine systems is known as the "Rapid System." In this system, the length of the film is limited since the film is pushed into the film magazines. Further, deformation of the film in the film magazine into which the film is loaded occurs and flatness thereof at the exposure aperture deteriorates.

SUMMARY OF THE INVENTION

The primary object of the present invention is to provide a novel roll film which is not deformed in a film magazine and whose flatness thereof is not adversely affected.

Another object of the present invention is to provide a novel roll film which has no backing paper, and accordingly, can be easily loaded into a film magazine or camera.

Still another object of the present invention is to provide a novel roll film which is loaded into a type film double magazine and the length of which is not limited.

BRIEF DESCRIPTION OF THE DRAWINGS

Other objects, features and advantages will be made apparent from the following description of a preferred embodiment thereof taken in conjunction with the accompanying drawings in which.

DESCRIPTION OF THE PREFERRED EMBODIMENT

Figure 1:
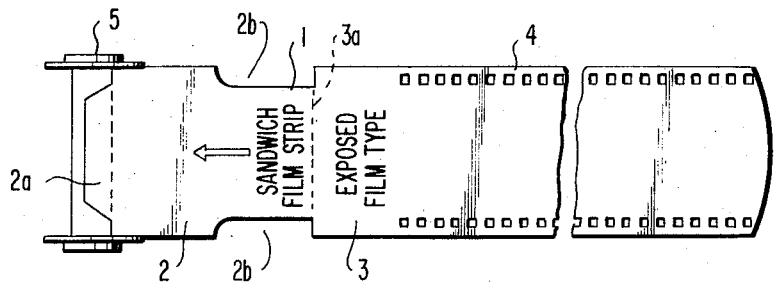
FIG. 1 is a plan view showing the roll film of the present invention extended and attached at one end to a film spool in a magazine.
Figure 2:
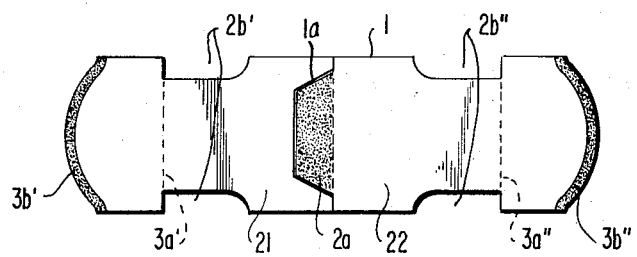
FIG. 2 is a plan view showing the paper in accordance with the present invention.
Figure 3:
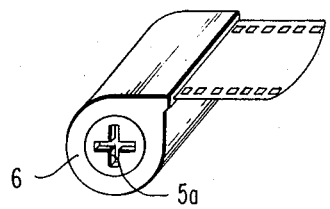
FIG. 3 is a perspective view of a film magazine loaded with the roll film in accordance with the present invention before exposure.

Now referring to the drawing, as shown in FIG. 1, the roll film in accordance with the present invention comprises a photosensitive film strip 4, a film spool 5, an intermediate paper 1 connecting said film strip 4 and film spool 5, and a magazine 6 for loading the film and the spool. The intermediate paper 1 is made of a piece of paper by cutting as generally shown in FIG. 2. In the drawing, FIG. 2, a thick solid line a shows where the paper 1 is cut. The paper 1 is provided with perforated lines 3a and 3a''. Adhesive is coated on the paper at the areas 2a, 3b' and 3b'', which are shown with hatching. Further, the paper 1 is provided with cut away portions 2b at the opposite side edges thereof as shown at 2b' and 2b'' in FIG. 1 and FIG. 2, so that the film may not be fed by the sprocket wheel when the cut away portions 2b overlie the sprocket wheel. It will be understood that the cut away portions may be omitted in the case that the film does not have perforations for film feeding.

The paper 1 as shown in FIG. 2 is folded at the center thereof and the tab portion 2a provided by cut line 1a is adhered to the surface of a spool. And an end of a photographic film 4 is sandwiched between two ends 3b' and 3b'' of the paper 1 adhered thereto. Thus, the film 4 is connected to the spool 5 by means of the paper 1 as shown in FIG. 1. At the portion 3 of the paper 1 is indicated some information as to the film such as the type of the film and an indication that the film has been exposed. It will be understood that two sheets of superposed paper can be used instead of the folded paper.

Now the way of using this film will be described. This roll film 4 is loaded into the magazine 6 together with the spool 5 on which the film is wound. This roll film 4 is taken out of one magazine and taken up into another magazine 7 of the same type. As for the take-up magazine, an empty magazine which was used to feed out a film thereof is used.

Figure 4:
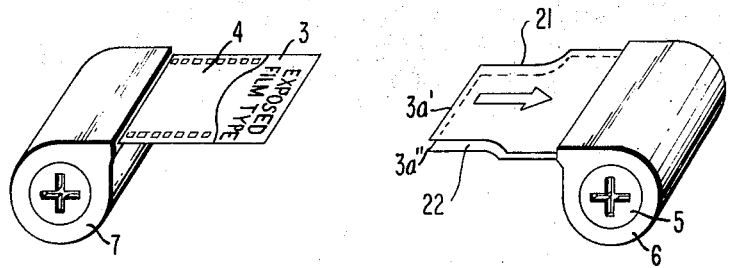
FIG. 4 is a perspective view of a film magazine loaded with the roll film in accordance with the present invention which is taken up therein after exposure.
Figure 5:
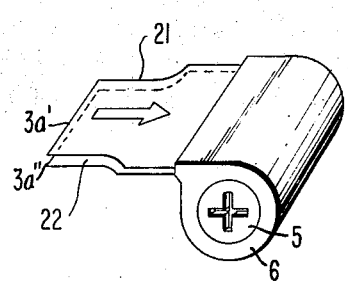
FIG. 5 is a perspective view of a film magazine which is emptied after exposure.

When the film 4 is all used up for taking pictures, the roll film 4 is taken up into the take-up magazine 7 and the paper 1 is drawn out of the feed out magazine following the end of the roll film. Then the paper 1 is separated by tearing off at the perforated portion along the perforated line 3a', 3a''. Thus the two magazines are separated as shown in FIGS. 4 and 5. The magazine 7 shown in FIG. 4 includes the exposed film which is to be sent to the development station. The film magazine shown in FIG. 5 is used as a take-up magazine for the subsequent photographing. That is, the end of the film to be exposed is sandwiched between the ends of the paper 21 and 22 (shown in FIG. 5) after a new film is loaded into a camera. Then by taking the film up on the spool in the magazine shown in FIG. 5, the film is wound on the spool therein. Thus, the magazine which was used for feeding out the film is now used for taking up the film without any particular operation such as pushing the film into the magazine in the conventional Rapid System.

In accordance with the present invention, there is no need to rewind the film back onto the feed out spool after finishing taking. Further, the loading of the film can be easily conducted. The flatness of the film can be maintained, since no backing paper is used. Furthermore, since the film is not forced into but pulled out of a film magazine different from the conventional Rapid System the length of the film is not limtied and the flatness thereof does not deteriorate.

It will be understood that the material for the paper member 1 is not strictly limited to paper but may be plastic film.

What is claimed is:

1. In a roll film construction for a double magazine having two sections of identical construction with the roll film passing from one section to another, said roll film and said magazine each carrying a spool for reelably holding film, the improvement comprising:

an intermediate paper connection strip folded at its center to form two similar layers, a first adhesive covered portion adjacent the center fold line facing outwardly for fixing said paper strip to one of said spools, and a pair of second adhesive covered portions adjacent the ends of said strip on the facing surfaces of said layers for attachement to respective sides of the end of said film, and a row of perforations across each layer intermediate said first and second adhesive covered portions to readily sever the film from said one spool after exposure and permit access to said first adhesive covered portion of said paper strip attached to said one spool to permit attachment of the end of a new film to said one spool from yet another spool.

2. The roll film construction as claimed in claim 1, wherein said first adhesive covered portion is partially cutout to form an adhesive covered tab portion.

* * * * *